United States Patent
Kjær et al.

(10) Patent No.: US 10,415,545 B2
(45) Date of Patent: Sep. 17, 2019

(54) ACTIVE POWER BOOST DURING WAKE SITUATION

(71) Applicant: VESTAS WIND SYSTEMS A/S, Aarhus N (DK)

(72) Inventors: Martin Ansbjerg Kjær, Harlev J (DK); Lars Finn Sloth Larsen, Sydals (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 206 days.

(21) Appl. No.: 15/118,795

(22) PCT Filed: Jan. 27, 2015

(86) PCT No.: PCT/DK2015/050018
§ 371 (c)(1),
(2) Date: Aug. 12, 2016

(87) PCT Pub. No.: WO2015/120856
PCT Pub. Date: Aug. 20, 2015

(65) Prior Publication Data
US 2017/0051723 A1     Feb. 23, 2017

(30) Foreign Application Priority Data
Feb. 12, 2014   (DK) .................................. 2014 70071

(51) Int. Cl.
*G05D 17/00* (2006.01)
*F03D 7/04* (2006.01)
(Continued)

(52) U.S. Cl.
CPC ........... *F03D 7/048* (2013.01); *F03D 7/0224* (2013.01); *F03D 7/0284* (2013.01); *F03D 9/257* (2017.02);
(Continued)

(58) Field of Classification Search
CPC ...... C10J 3/463; F03D 7/0284; F03D 7/0204; F03D 7/028; F03D 1/065; F03D 7/0292;
(Continued)

(56) References Cited

U.S. PATENT DOCUMENTS

2004/0253093 A1* 12/2004 Shibata ................. F03D 7/0204
415/4.1
2006/0233635 A1* 10/2006 Selsam ................... F03D 1/065
415/4.3
(Continued)

FOREIGN PATENT DOCUMENTS

| CN | 1437684 A | 8/2003 |
|---|---|---|
| CN | 1879275 A | 12/2006 |

(Continued)

OTHER PUBLICATIONS

Kanev et al, "Wind farm modeling and control: an inventory", Dec. 2013, ECN-E-13-058, pp. 1-36 <Kanev_Savenije.pdf>.*
(Continued)

*Primary Examiner* — Tuan A Vu
(74) *Attorney, Agent, or Firm* — Patterson + Sheridan, LLP

(57) ABSTRACT

The present invention relates to a method for operating a wind power plant in a wake situation, said wind power plant being connected to a power grid, the method comprising the steps of operating the wind power plant in a predetermined power mode of operation, terminating said predetermined power mode of operation, and increasing power generation of the wind power plant to a power level that exceeds an optimized wake power level of the wind power plant, and injecting the increased amount of power into the power grid as a power boost. Thus, the present invention is capable of generating a power boost to an associated power grid, said power boost exceeding the power level normally being (Continued)

available in a wake situation. The present invention further relates to a system for carrying out the method.

20 Claims, 5 Drawing Sheets

(51) Int. Cl.
    *F03D 7/02*     (2006.01)
    *F03D 9/25*     (2016.01)
    *G05B 15/02*     (2006.01)

(52) U.S. Cl.
    CPC ...... *G05B 15/02* (2013.01); *F05B 2270/1033* (2013.01); *F05B 2270/328* (2013.01); *F05B 2270/337* (2013.01); *G05B 2219/2619* (2013.01); *Y02E 10/723* (2013.01); *Y02E 10/725* (2013.01); *Y02E 10/726* (2013.01)

(58) Field of Classification Search
    CPC ..... F03D 7/048; Y02E 10/723; Y02E 10/725; Y02E 10/726
    See application file for complete search history.

(56) References Cited

U.S. PATENT DOCUMENTS

| | | | | |
|---|---|---|---|---|
| 2009/0099702 | A1* | 4/2009 | Vyas | F03D 7/0292 700/287 |
| 2009/0234510 | A1* | 9/2009 | Helle | F03D 7/0284 700/287 |
| 2011/0144816 | A1 | 6/2011 | Morjaria et al. | |
| 2012/0000175 | A1* | 1/2012 | Wormser | C10J 3/463 60/39.12 |
| 2012/0112458 | A1* | 5/2012 | Numajiri | F03D 7/0204 290/44 |
| 2012/0133138 | A1* | 5/2012 | Sorensen | F03D 7/028 290/44 |
| 2013/0103202 | A1* | 4/2013 | Bowyer | F03D 7/0292 700/275 |
| 2014/0037447 | A1 | 2/2014 | Attia | |

FOREIGN PATENT DOCUMENTS

| | | |
|---|---|---|
| CN | 1894837 A | 1/2007 |
| CN | 101413483 A | 4/2009 |
| CN | 102312782 A | 1/2012 |
| CN | 102472250 A | 5/2012 |

OTHER PUBLICATIONS

Kuenzel Stefanie et al: "Impact of Wakes on Wind Farm Inertial Response", IEEE Transactions on Sustainable Energy, IEEE, USA, vol. 5, No. 1, Jan. 1, 2014, pp. 237-245.

Jacob Aho et al: "A tutorial of wind turbine control for supporting grid frequency through active power control", American Control Conference (ACC), 2012, IEEE, Jun. 27, 2012, pp. 3120-3131.

Danish Search Report for PA 2014 70071, dated Sep. 17, 2014.

International Search Report for PCT/DK2015/050018, dated Apr. 21, 2015.

SIPO of the People's Republic of China Notifrication of the First Office Action for Application No. 21580008626.X dated Apr. 16, 2018.

SIPO of the People's Republic of China Notification of the Second Office Action for Application No. 21580008626.X dated Jan. 3, 2019.

* cited by examiner

ACTIVE POWER BOOST DURING WAKE SITUATION

FIELD OF THE INVENTION

The present invention relates to active power boosts during a wake situation of a wind power plant. In particular, the present invention relates to active power boosts that exceed power levels normally achievable during optimized wake scenarios.

BACKGROUND OF THE INVENTION

Within a wind power plant, wind turbine generators block wind for one another if the wind comes from certain directions. This causes losses—so-called wake losses—as a down-wind wind turbine generator sees a reduced wind speed since the wind energy has been extracted by an up-wind wind turbine generator.

A lot of focus has been put on the optimization of entire wind power plants and not only on individual wind turbine generators. Wind power plant developments are traditionally, among other topics, focused on the following topics:
1. Control of power to provide advances services for grid stabilization
2. Reduction of wake losses between wind turbine generators Area 1) originates from an electrical-power approach including system (power grid) control and stability. For instance, the power grid operator sees an advantage in having a power reserve standing in the case of a sudden power drop due to shortcuts in the grid, generators disconnecting etc. If a wind power plant can provide a capacity for fast power injection at request, power plant owners could potentially increase the revenue from selling higher-quality power.

Traditionally, the most obvious way to provide and establish a primary power reserve is to withhold a certain amount of the available power production. For instance, if a wind power plant has a rated power level of 10 MW, it may be curtailed to 8 MW so that the remaining 2 MW can be sold as a primary power reserve. If the owner is compensated sufficiently well for the provided primary power reserve it may still be an attractive business case.

However, if the primary power reserve could be offered while still producing the rated power of 10 MW the business case would be even more favourable. Primary power reserve is intended for very fast power injection over a limited time period, typically until a secondary control scheme takes over.

Area 2) is more focused on aero-dynamical development and understanding of wind and wind propagation when interacting with the turbine blades. A general theory is that allowing wind to pass the first wind turbine generator in a row will lead to smaller power production up-wind, but larger power production down-wind because more wind becomes available to down-wind wind turbine generators. This would generally increase the power production of the down-wind wind turbine generators. The resulting combined power production can then be increased compared to all wind turbine generators being "greedy". However, there is a large uncertainty associated with his theory.

DESCRIPTION OF THE INVENTION

In view of the above, it may be seen as an object of embodiments of the present invention to utilize the fact that it takes time for a wind change introduced by an up-wind wind turbine generator to propagate to one or more down-wind wind turbine generators.

It may be seen as a further object of embodiments of the present invention to utilize this delay time for a temporarily power boost.

It may be seen as an even further object of embodiments of the present invention to use this temporarily power boost as a primary reserve for grid support/stabilization.

The above-mentioned objects are complied with by providing, in a first aspect, a method for operating a wind power plant in a wake situation, said wind power plant being connected to a power grid, the method comprising the steps of
- operating the wind power plant in a predetermined power mode of operation,
- terminating said predetermined power mode of operation, and
- increasing power generation of the wind power plant to a power level that exceeds an optimized wake power level of the wind power plant, and injecting the increased amount of power into the power grid as a power boost.

A wake situation occurs when an up-wind wind turbine generator reduces the wind speed behind it and thereby reduces the power production of a wind power plant as a whole.

The power boost being available as a result of the present invention thus exceeds the power level being available from the wind power plant if said wind power plant is operated in accordance with an optimised wake power scheme.

The predetermined power mode of operation may comprise a de-rated power mode of operation. The de-rated power mode of operation may generate power below 95%, such as below 90%, such as below 80%, such as below 70%, such as below 60%, such as below 50% of a rated power level of the wind power plant.

It is an advantage of the present invention that in the de-rated mode of operation the required curtailment during continuous operation of the wind power plant is only a fraction compared to prior art systems. For example a power curtailment of only 1 MW will typically allow a 3 MW active power boost.

Alternatively, the predetermined power mode of operation may comprise an optimised wake mode of operation where the wind power plant generates the optimized wake power level for the actual wind direction. The optimised wake mode of operation may be based on power calculations from at least one up-wind wind turbine generator and at least one down-wind wind turbine generator. However, the present invention is by no means bound to any specific wake calculation method.

The power injected into the power grid as the power boost may comprise active power.

The termination of the predetermined power mode of operation may in principle be triggered by any event, such as a decreased power grid frequency.

In a second aspect the present invention relates to a wind power plant being operated in a wake situation while being connected to a power grid, the wind power plant comprising
- control means for operating the wind power plant in a predetermined power mode of operation, and terminating said predetermined power mode of operation upon detection of a predetermined event, and
- control means for increasing power generation of the wind power plant to a power level that exceeds an optimized wake power level of the wind power plant, and injecting the increased amount of power into the power grid as a power boost.

Again, the wake situation occurs when an up-wind wind turbine generator reduces the wind speed behind it and thereby reduces the power production of a wind power plant as a whole.

The wind power plant may further comprise means for measuring the power grid frequency.

Similar to the first aspect the predetermined power mode of operation may comprise a de-rated power mode of operation, or comprise an optimised wake mode of operation where the wind power plant generates the optimized wake power level.

BRIEF DESCRIPTION OF THE DRAWINGS

The present invention will now be described in further details with reference to the accompanying figures, wherein.

Figure 1:
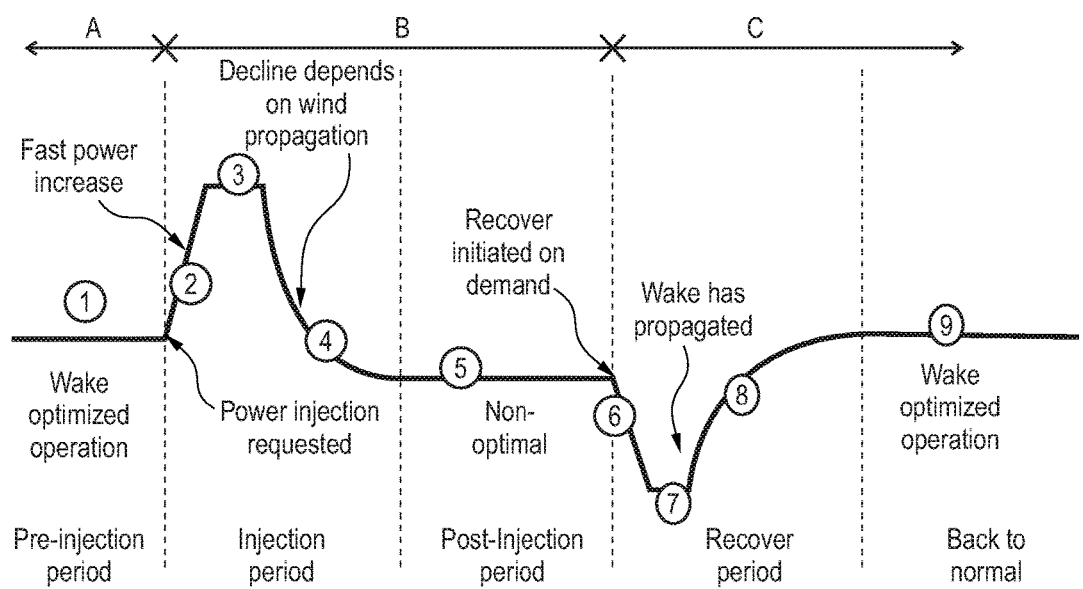
FIG. 1 shows a schematic of power injection sequence.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

Generally, the present invention is applicable in situations where an up-wind wind turbine generator may reduce the wind speed for one or more down-wind wind turbine generators, i.e. in a wake situation.

The present invention is generally applicable in the following two wake-based scenarios:
1. Optimized wake mode of operation (maximum output power at the actual wind speed)
2. Curtailed mode of operation (de-rated output power in wake situation)

The present invention aims at providing a primary power reserve by switching an optimized wake mode of operation off, or alternatively by terminating a curtailed mode of operation.

The power injection according to the present invention is intended for situations where the wind direction causes wake losses. If no wind turbine generators are in the wake of other wind turbine generators, the present invention offers only minor advantages. Moreover, power injection according to the present invention is primarily intended for partial-load wind conditions as wake optimization is most effective at lower wind speeds.

The present invention is based on the following understanding of wind propagation within wind power plants. A wind power plant comprises a plurality of wind turbine generators. Imagine that some or all of the wind turbine generators of a wind power plant are operating with reduced efficiency according to a given wake optimization method. Each wind turbine generator will then experience that it could increase its power production simply by increasing the local efficiency. This is certainly true, at least for a short period of time. When an up-wind wind turbine generator increases its efficiency the wind speed behind it decreases. However, as the decreased wind speed propagates with the wind, the next wind turbine generator (down-wind wind turbine generator) will not experience this decrease immediately. Therefore, there will be a short period of time where the generated power from the wind power plant will actually increase and thus form a power boost. However, as the wake propagates through the wind power plant the total amount of generated power will settle at a power level that is lower than the original power level.

The present invention relies on the above-mentioned capability to make a power boost available, and use this power boost as a primary power reserve. In order to utilize the boosting for primary reserve knowledge of the boosting level is needed. That is, the owner of the wind power plant must be able to supply an accurate estimate of the level of additional power which can be temporally supplied in case of grid problems. Also, it could be beneficial to know the power levels which may be obtained when the wakes have fully propagated and steady-state operation is regained.

The power boosting capacity is dependent on the single turbine generator's capability to maximize the local power according to the wind scenario it sees at the time of boosting. The power boosting is only obtained in the time interval from boost is enabled until the wakes have propagated. Therefore, the wake interaction has no effect on the boosting capability, assuming the boosting is initiated from a steady wake situation. Hence, the boosting capability can be estimated from local turbine variables alone.

For instance, it can be found from measuring the wind speed and make a table look-up in a power curve. Alternatively, the boosting estimate can be found by evaluating the basic power equation $$P = \frac{1}{2}\rho A C_p V^3$$

where P is the power estimate, p is the air density, A is the area swept by the rotor, Cp is the best obtainable efficiency for the given circumstances, and V is the wind speed. It should be noted that other estimation methods could also be used, for instance, involving pitch and rotor-speed dependent Cp, and/or expressions involving the dynamics of the rotor system.

The estimation of the power levels reached after the wakes have propagated and settled require more detailed models involving the wake themselves. Simple easy-to-execute examples of such models could be the so-called N. O. Jensen model or the S. Fransen model. However, any suitable model can be used. The models should take into account the fact that the local wind speed at the wind turbine generators depends on the power production of the up-wind turbine generators.

The estimated power levels may be used as follows:

Example #1: Wake Optimized Operation

Assume a wind power plant is operating according to some (here unspecified) wake optimized method. That is, the target is to make the wind power plant produce as much power as possible. Any boosting capacity can then be used to provide a primary reserve. In this scenario the local boosting estimate is used to indicate the level of power available for primary reserve. The owner can use this estimate to trade/negotiate a payment for the reserve from the TSO.

On the contrary without the boosting estimate, the owner would not be able to know the boosting level and could not sell the primary reserve.

Example #2: Curtailed Mode of Operation

Assume the wind power plant can produce as much power as it can (and get paid accordingly) but have to provide a specific amount of primary reserve (for instance 5 MW). This can be done in two ways:
1): Slowly reduce the power production while monitoring the local boosting estimate. Adjust the power production until the difference between the current production and the boosting estimate is equal to the required level of primary reserve.
2): Based on the model from the stable power level and the equation for the estimated local boosting level the combination of power production and boosting level, which gives the required level of primary reserve, is determined. This could be implemented as a search algorithm or as a look-up table.

In either way, by using the above-mentioned power estimates the owner is able to run the power plant at a higher power level while still providing the required primary reserve. The higher pre-boost equals higher revenue for the owner. Without the estimate it would not be possible for the owner to know to what level the wind power plant should be curtailed in order to utilize the boosting capability and the wind power plant would have to be curtailed by the full primary reserve level.

Reference is now made to FIG. 1 where the scenario of a wake-optimized operation will be explained in detail. In the pre-injection period (1) all wind turbine generators produce power according to a wake-optimized operation. At a given time, the wind power plant is being requested to inject power into the power grid. All wind turbine generators pitch their rotor blades to obtain the most power capture from the wind. As a result, the power production of all wind turbine generators increase relative fast (2) and stay constant for a short while (3). This increase in power production will cause a lower wind speed behind the up-wind wind turbine generators, and this lower wind speed will travel with the wind to down-wind wind turbine generators. Thus, after a while, a down-wind wind turbine generator will experience the wind speed decrease, and even if the rotor blades are pitched to extract as much power as possible the power production will decline (4). After all wind speeds have settled, the wind power plant will deliver a new steady-state power production (5) which is lower than the power production prior to the power injection (1).

At some stage, the power plant owner would like to get the full potential out of the wind power plant and thus choose to bring the power plant back to an optimized wake mode of operation. This is done by pitching the rotor blades out of the wind to let wind through to the down-wind wind turbine generators. As this is non-optimal seen from the local wind turbine generator perspective, the power generated by the individual wind turbine generators will decreases further (6) and cause a drop in the overall power generation (7). As the wind speed at the down-wind wind turbine generators starts to increase (8), the overall plant power returns to its original level, and finally, the full power production has been recovered and the wind power plant is back to its optimal power production (9).

The power injection and recovery periods are both initiated by control means, i.e. it is a deliberate choice to initiate both of them. The decline (4) in power in the injection period is driven by the propagation of wind and is therefore not to be controlled. Likewise, the power increase (8) during the recovery period is uncontrolled.

The recovery period does not have to be as dramatic as illustrated in FIG. 1. The wake optimized operation could be put back gradually—either by pitching slowly on all wind turbine generators or by changing one wind turbine generator at a time. However, the energy lost will be approximately the same as it will take longer time to regain optimality.

The length of the post-injection period (5) is therefore a design parameter. To gain most production for the owner it should be conducted immediately after the injection period. However, as the power injection is initiated to compensate a general lack of power in the grid, the grid would not like a sudden power drop from the wind farm. Therefore, the recovery period would be initiated after the stability of the grid has been regained.

FIG. 1 further indicated zones A, B and C. In zones A and C the wind power plant is operated in accordance with an optimized wake mode, whereas in zone B all of the wind turbine generators are allowed to produce maximum power.

The principle underlying the present invention is by no means bound to any specific wake optimization scheme. The present invention only assumes that the individual wind turbine generators operate with reduced efficiency compared to their respective rated power levels.

As previously mentioned advantages could also be gained if no optimized wake mode of operation is applied. Consider the situation where a wind power plant has de-rated a first wind turbine generator in order to curtail the overall power plant power level. If a power injection to the power grid is then requested changing the first wind turbine generator to optimal power production would increase the power production of this wind turbine generator very fast, and the power from the wind power plant would increase to a level above normally "available power". As the wake propagates down the row of wind turbine generators, the power from the wind power plant will decrease to a steady-state level corresponding to 100% of available power.

In the following the optimized wake mode of operation and the curtailed mode of operation will be explained in further details.

Example #1: Wake Optimized Operation

To show the potential of the present invention in an optimized wake scenario, power levels of a real wind power plant have been investigated. The wind power plant in question consists of five wind turbine generators positioned along a straight line with a distance corresponding to four rotor diameters.

Figure 2:
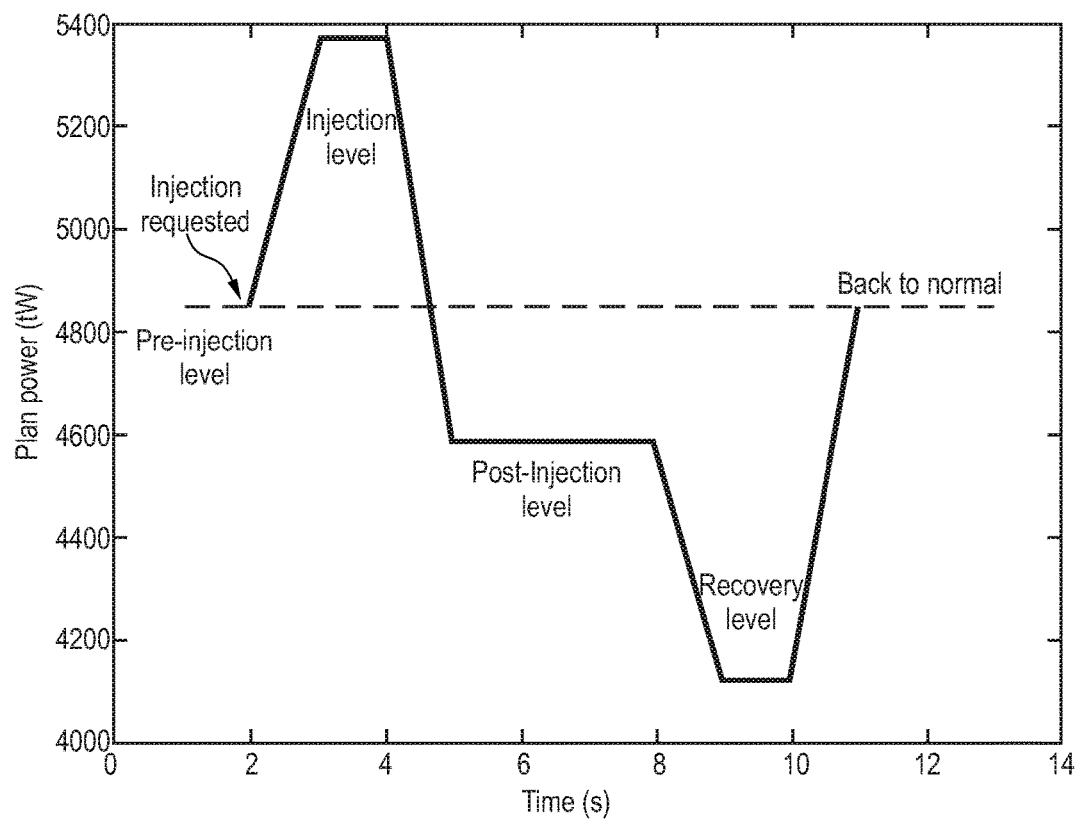
FIG. 2 shows examples of power levels for a power injection sequence.

Referring now to FIG. 2 a power injection sequence is illustrated. As seen the injection sequence has the same overall shape as depicted in FIG. 1. Thus, the injection sequence comprises a pre-injection level, an injection level, a post-injection level, a recovery level and a "back to normal" level.

It can be seen in FIG. 2 that at the selected ambient wind speed the wind power plant is capable of injecting ~500 kW (injection level) into the power grid as a power boost. This corresponds to around 9% of the actual power production.

Typically, active power boosts of between 5% and 10% of the rated power plant level are achievable.

Figure 3:
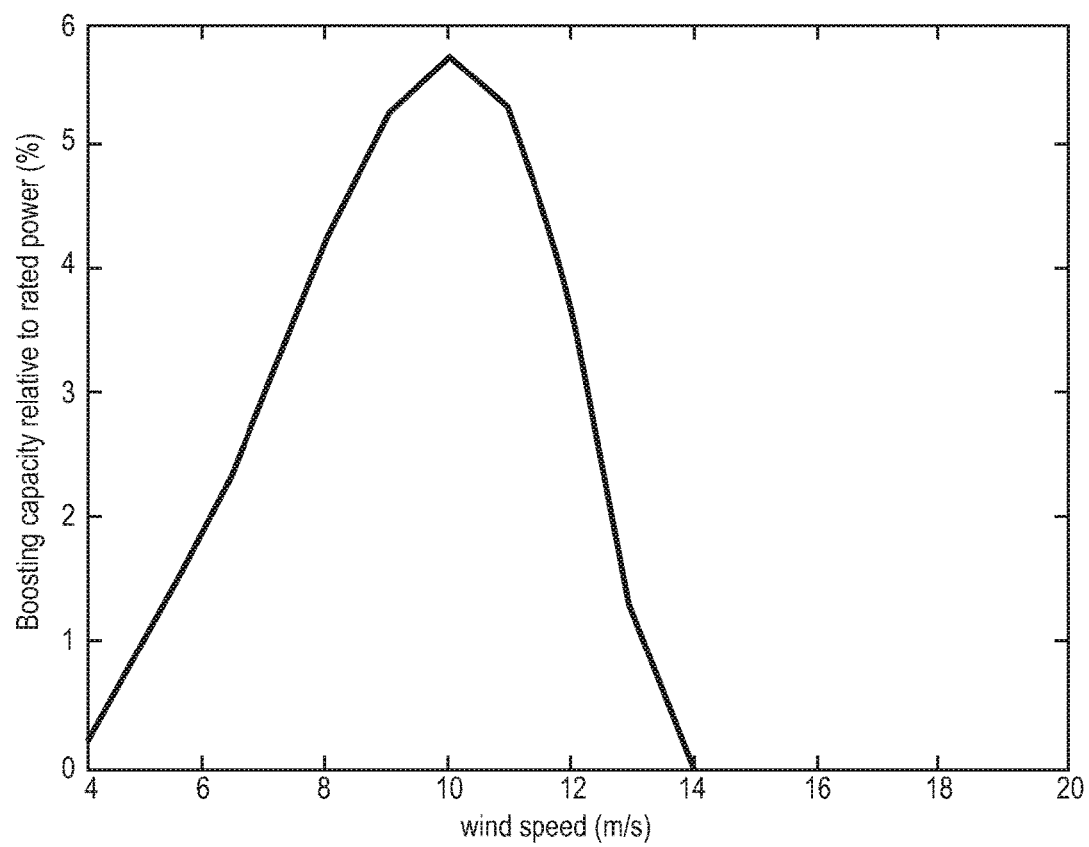
FIG. 3 shows power injection levels (relative to rated power) for different wind speeds.

FIG. 3 shows the power injection capacity (relative to rated power) of a real wind power plant for various wind speeds (from 4-20 m/s). As seen, power injection is only available for partial-load wind. Moreover, FIG. 3 shows that a power injection peak of around 6% of the rated power plant level should be achievable. In the simulation shown in FIG. 3 the power injection peak is reached at a wind speed of around 10 m/s.

Figure 4:
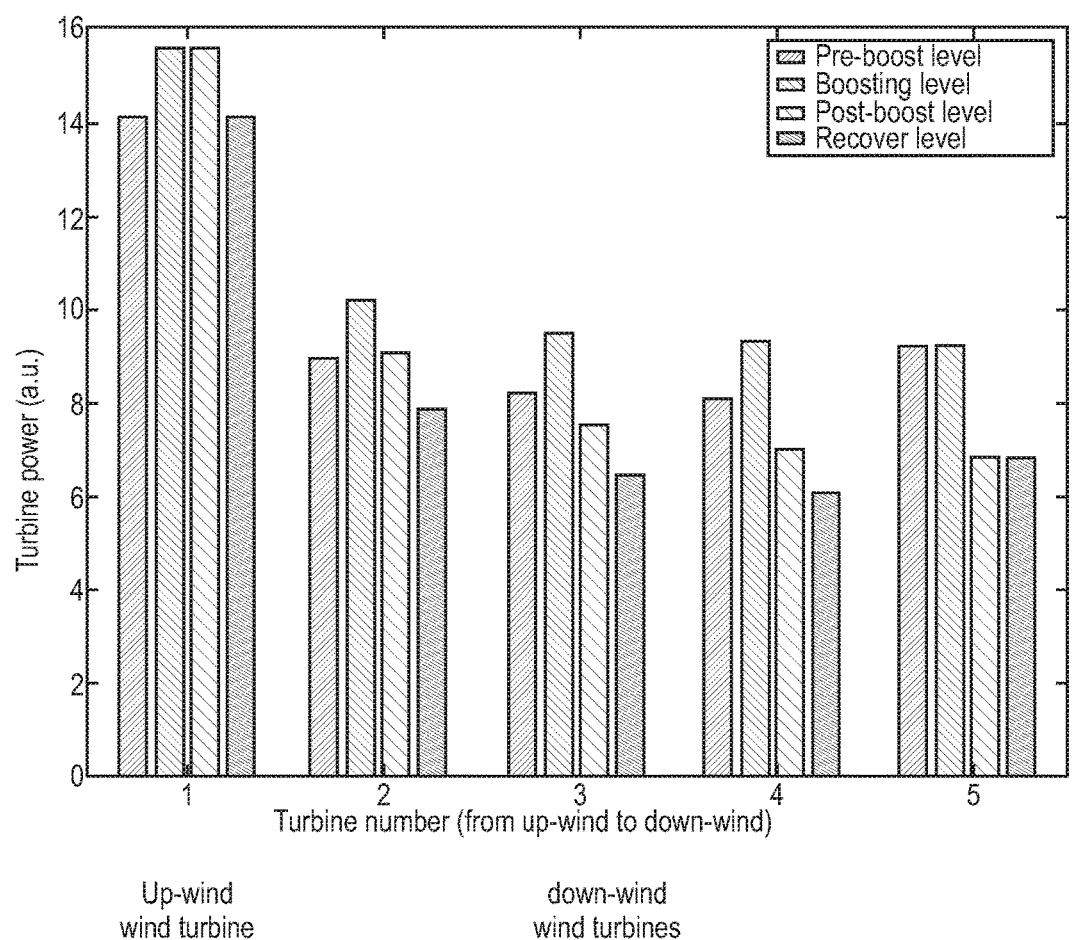
FIG. 4 shows power production levels for up-wind and down-wind wind turbine generators.

FIG. 4 shows typical power levels of the individual wind turbine generators of a wind power plant in the following four modes of operation:
1. Pre-boost power level (left bar),
2. Boosted power level (second left bar),
3. Post-boost power level (second right bar), and
4. Recovered power level (right bar).

In FIG. 4 the generated power level of the up-wind wind turbine generator is shown to the left (left group of columns) whereas the generated power levels of the remaining four down-wind wind turbine generators are depicted to the right thereof as four groups of columns.

As seen in FIG. 4 the power boost is primarily generated by the up-wind wind turbine generator and the three down-wind wind turbine generators closest to it. The fourth down-wind wind turbine generator does not contribute significantly to the power boost.

Example #2: Curtailed Mode of Operation

As stated previously the present invention is also applicable for wind power plants not being operated in an optimized wake mode of operation. Imagine the scenario where a wind power plant is requested to provide a power injection capacity of for example 3 MW. Applying traditional methods, the wind power plant thus needs to be curtailed 3 MW during continuous operation. That is, the wind power plant has to operate 3 MW below what the actual wind allows. According to the present invention the wind power plant need less curtailment. For example, in a wake situation a 1 MW curtailment can provide a 2 MW boosting. In this case, the wind power plant produces additional 2 MW in continuous operation giving the owner more revenue.

Figure 5:
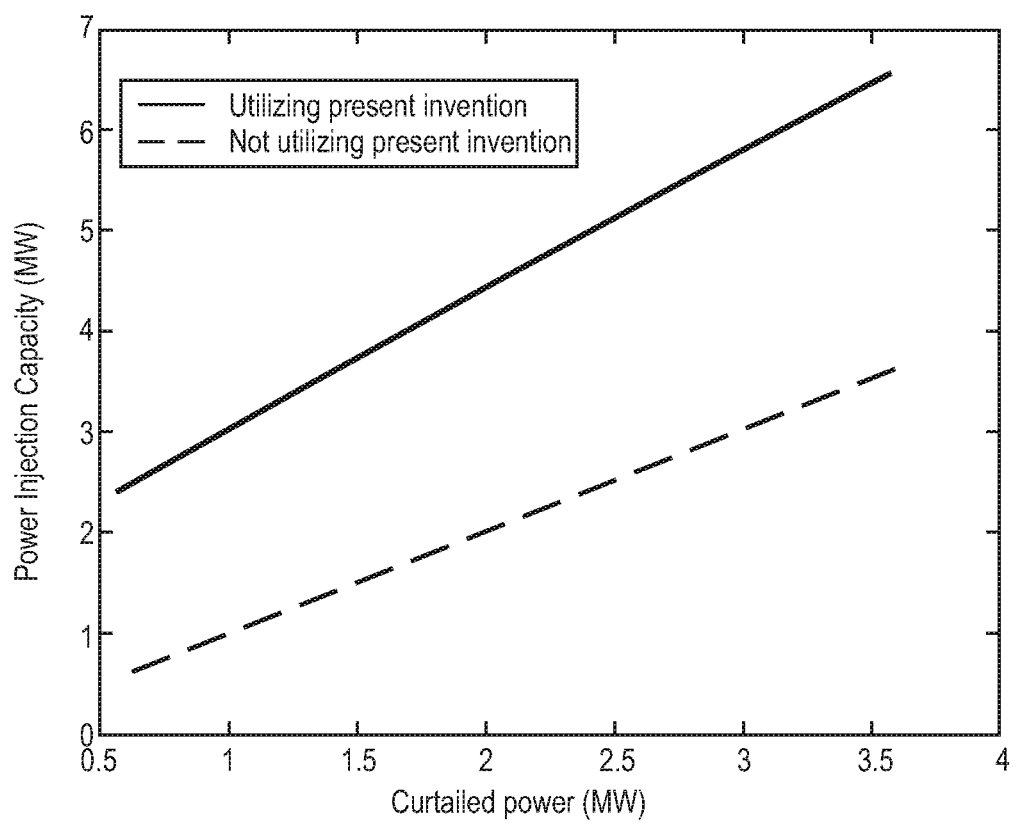
FIG. 5 shows a comparison between traditional curtailment and curtailment when the present invention is applied.

FIG. 5 shows a relationship between the level of curtailment and the power injection capacity using traditional techniques (dashed line) and the present invention (solid line). For instance, it shows that in order to provide a 3 MW power injection capacity the wind power plant has to curtail only 1 MW of power if the principle underlying the present invention is applied. Thus, by using the present invention, the owner can produce 2 MW more power during the curtailment period. Using traditional techniques a 1:1 relationship applies between the power injection capacity and the curtailment level.

What is claimed is:

1. A method for operating a wind power plant connected to a power grid, the method implemented with a power plant controller programmed with memory-stored instructions which, when executed by the controller, perform the method, comprising:
    collectively operating a plurality of wind turbine generators (WTGs) of the wind power plant in a predetermined power mode of operation, wherein under current wind conditions at the wind power plant at least a first downwind WTG of the plurality of WTGs is within a wake of at least a first upwind WTG of the plurality of WTGs; and
    responsive to a predetermined event:
        communicating control signals to one or more WTGs of the plurality of WTGs, wherein a power output level of at least the first upwind WTG is increased beyond a corresponding power output level in the predetermined power mode of operation, and wherein a power output level that is output to the power grid by the wind power plant exceeds an optimized wake power level representing a maximum steady-state output power of the wind power plant under the current wind conditions.

2. The method according to claim 1, wherein the predetermined power mode of operation comprises a de-rated power mode of operation.

3. The method according to claim 2, wherein the wind power plant, in the de-rated power mode of operation, generates power at one of: below 95%, below 90%, below 80%, below 70%, below 60%, and below 50% of a rated power level of the wind power plant.

4. The method according to claim 1, wherein the predetermined power mode of operation comprises an optimized wake mode of operation where the wind power plant generates the optimized wake power level.

5. The method according to claim 4, wherein the optimized wake mode of operation is based on power calculations from at least the first upwind WTG and at least the first downwind WTG.

6. The method according to claim 1, wherein the increase to the power output level of at least the first upwind WTG comprises an increase in active power.

7. The method according to claim 1, wherein the predetermined event comprises detecting a decreased power grid frequency.

8. The method according to claim 1, further comprising:
    estimating a size of the increase to the power output level of at least the first upwind WTG.

9. The method of claim 1, wherein the power output level that is output to the power grid by the wind power plant is increased by:
    increasing the power output level of the first upwind WTG beyond the corresponding power output level in the predetermined power mode of operation; and
    prior to experiencing wake effects at the first downwind WTG caused by the increase to the power output level of the first upwind WTG, maintaining or increasing a power output level of the first downwind WTG.

10. The method of claim 9, wherein, after experiencing the wake effects at the first downwind WTG, the power output level that is output to the power grid by the wind power plant settles at a steady-state output power level that is less than an output power level of the wind power plant in the predetermined power mode of operation.

11. The method of claim 10, further comprising:
    when the wind power plant is settled at the steady-state output power level, pitching rotor blades of the first upwind WTG to reduce the wake affecting the first downwind WTG, wherein the power output level of the wind power plant is temporarily reduced to less than the steady-state output power level.

12. The method of claim 11, wherein beginning the pitching of the rotor blades of the first upwind WTG is controlled according to a predefined parameter.

13. The method of claim 11, wherein responsive to reducing the wake affecting the first downwind WTG, the power output level of the wind power plant increases to the output power level in the predetermined power mode of operation.

14. The method of claim 13, wherein the at least a first downwind WTG comprises a second downwind WTG, the method further comprising:
pitching rotor blades of the first downwind WTG and of the second downwind WTG at the same time to increase the power output levels of the first downwind WTG and the second WTG.

15. A wind power plant comprising:
a plurality of wind turbine generators (WTGs) connected to a power grid; and
a power plant controller configured to:
collectively operate the plurality of WTGs in a predetermined power mode of operation, wherein under current wind conditions at the wind power plant, at least a first downwind WTG of the plurality of WTGs is within a wake of at least a first upwind WTG of the plurality of WTGs; and
responsive to a predetermined event:
communicate control signals to one or more WTGs of the plurality of WTGs, wherein a power output level of at least the first upwind WTG is increased beyond a corresponding power output level in the predetermined power mode of operation, and wherein a power output level that is output to the power grid by of the wind power plant exceeds an optimized wake power level representing a maximum steady-state output power of the wind power plant under the current wind conditions.

16. The wind power plant according to claim 15, further comprising:
a sensor configured to measure a frequency of the power grid.

17. The wind power plant according to claim 15, wherein the predetermined power mode of operation comprises a de-rated power mode of operation.

18. The wind power plant according to claim 15, wherein the predetermined power mode of operation comprises an optimized wake mode of operation where the wind power plant generates the optimized wake power level.

19. A method for operating a wind power plant connected to a power grid, the method implemented with a power plant controller programmed with memory-stored instructions which, when executed by the controller, perform the method, comprising:
estimating a size of an increased amount of power to be injected into the power grid as a power boost;
collectively operating a plurality of wind turbine generators (WTGs) of the wind power plant in an optimized wake mode of operation corresponding to an optimized wake power level of the wind power plant, wherein under current wind conditions at the wind power plant at least a first downwind WTG of the plurality of WTGs is within a wake of at least a first upwind WTG of the plurality of WTGs, wherein the optimized wake power level represents a maximum steady-state output power of the wind power plant under the current wind conditions; and
responsive to an input command signal, switching operation of the wind power plant from the optimized wake mode of operation to a boosted power mode of operation, wherein switching operation of the wind power plant comprises communicating control signals to one or more WTGs of the plurality of WTGs to increase power levels of the one or more WTGs,
wherein a power output level of at least the first upwind WTG is increased beyond a corresponding power output level in the optimized wake mode of operation, and
wherein, after increasing the power levels of the one or more WTGs, a power generation of the wind power plant is increased to a power level that exceeds the optimized wake power level.

20. The method according to claim 19, further comprising:
collectively operating the plurality of WTGs of the wind power plant at a sub-optimal power generation level relative to the optimized wake mode of operation; and
entering a recovery phase by pitching respective blades of one or more WTGs of the plurality of WTGs,
wherein the recovery phase is characterized by increasing power generation of the wind power plant relative to the sub-optimal power generation level.

* * * * *